A. J. BORST, Jr.
VEHICLE LOCK.
APPLICATION FILED JULY 6, 1908.
993,499.
Patented May 30, 1911.
2 SHEETS—SHEET 1.
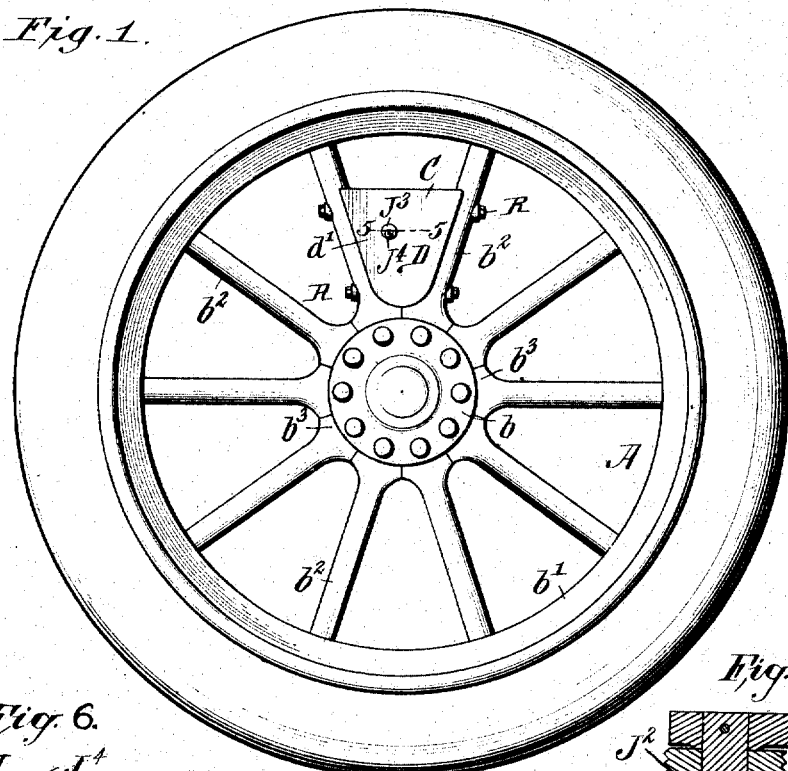
Fig. 1.
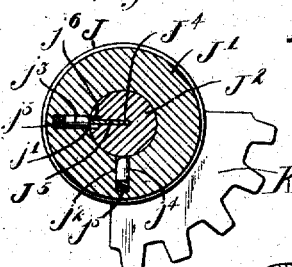
Fig. 6.
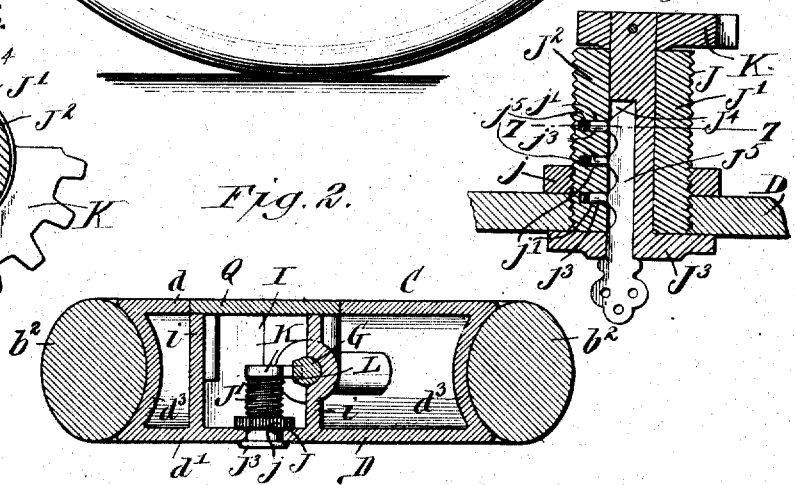
Fig. 5.
Fig. 2.
Witnesses:
Christ Finke Jr.
Harry D. Rapp.
Andrew J. Borst, Jr., Inventor
By Emil Neuhart
Attorney.

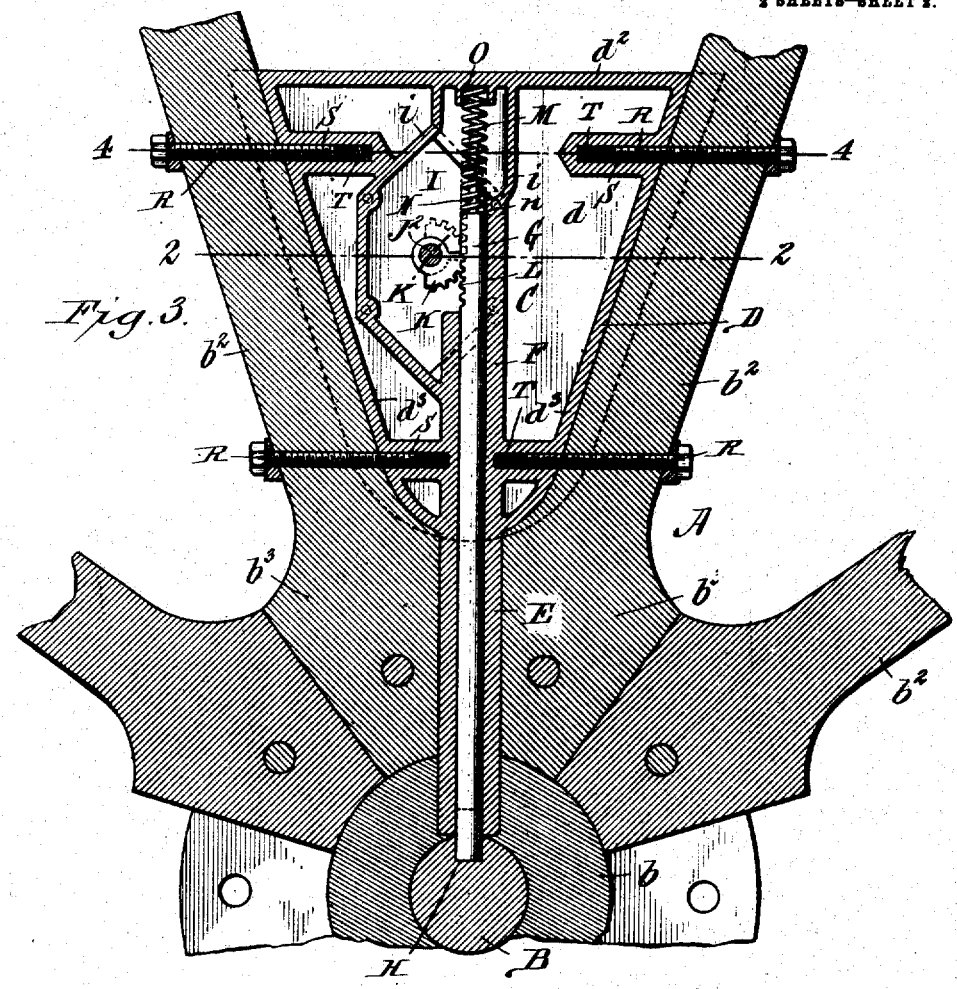

UNITED STATES PATENT OFFICE.

ANDREW J. BORST, JR., OF BUFFALO, NEW YORK.

VEHICLE-LOCK.

993,499.

Specification of Letters Patent.

Patented May 30, 1911.

Application filed July 6, 1908. Serial No. 442,179.

*To all whom it may concern:*

Be it known that I, ANDREW J. BORST, Jr., a citizen of the United States, and resident of Buffalo, in the county of Erie and State of New York, have invented certain new and useful Improvements in Vehicle-Locks, of which the following is a specification.

My invention relates to locks for vehicles and more particularly to locks for attachment to vehicle-wheels to prevent rotation thereof.

My invention has for its object, the production of a lock which rotates with a vehicle-wheel and the locking-member of which is adapted to engage a non-rotatable part of the vehicle and thus prevent the vehicle being driven away by a person bent upon mischief or theft.

Another object is the production of a lock for this purpose which can be applied to any form of vehicle having traction-wheels and which is so confined between the spokes of a wheel that there will be no projecting parts.

A still further object is the production of a durable and inexpensive lock which consists of few parts and which is not likely to become injured or the working parts thereof disarranged.

With these and other objects in view to be hereinafter disclosed, the invention consists in the construction, arrangement and combination of parts to be hereinafter described and particularly set forth in the appended claims.

In the drawings,—Figure 1 is a side elevation of a vehicle-wheel equipped with my invention. Fig. 2 is a cross section taken on line 2—2, Fig. 3. Fig. 3 is an enlarged vertical section through the locking-device, a portion of the wheel and the axle on which the wheel rotates. Fig. 4 is a cross-section taken on line 4—4, Fig. 3. Fig. 5 is an enlarged horizontal section taken on line 5—5, Fig. 1, the key slot being in horizontal position. Fig. 6 is a cross section taken on line 7—7, Fig. 5.

Referring now to the drawings in detail, like letters of reference refer to like parts in the several figures.

The reference letter A designates a vehicle-wheel, B an axle on which said wheel is rotatably mounted, and C my improved locking-device. The wheel herein shown has a hub $b$, a rim $b^1$ and the usual radial spokes $b^2$. While this form of wheel is preferred for application of my improved locking-device thereto, the latter may however be applied to any other form of wheel.

The preferred embodiment of my invention is shown in the drawings, and is constructed and the several parts combined as will now be described.

A tapering casing D is provided which fits between two adjoining spokes and has a bushing E projecting inward between the enlarged inner ends $b^3$ of said spokes and into the hub $b$. This casing comprises a rear or inner wall $d$, a front or outer wall $d^1$, a top wall $d^2$ and edge or side walls $d^3$ which are curved to meet at their lower ends to form the bottom from which the bushing E extends. The edge or side walls are concaved to fit the spokes, which are usually oval in cross section.

Arranged longitudinally and centrally in the casing is an integral sleeve F in which is slidably held a lock-bolt G extending into the bushing E and adapted to have its inner end engage the axle to prevent rotation of the wheel. While this may be accomplished in various ways, I preferably provide the axle with a socket H into which the inner end of the lock-bolt is adapted to enter.

A chamber I is provided within the casing by walls $i$ connecting the inner and outer walls $d$ and $d^1$, respectively, and the sleeve F is so formed with respect to the walls $i$ that it opens into said chamber at its upper end and forms part of said walls. Within said chamber, locking-mechanism J is located which may be of any common construction, but in the drawings I have shown a pin tumbler lock comprising a lock-casing $J^1$ preferably threaded into the casing D and held therein by a nut $j$ which bears against the inner side of the casing D but which may be formed integrally with the casing D, as shown in the modification Fig. 6. The lock-casing $J^1$ is provided with two series of sockets $j^1$, $j^3$ in which are located lock-pins $j^3$, $j^4$, respectively. Between the inner end of each lock-pin and the inner wall of each socket is located a spring $j^5$ adapted to project the lock-pins toward the axle of the lock-casing. In the lock casing is fitted an oscillating spindle $J^2$ which has an enlargement $J^3$ at its outer end serving as a cap to provide a finish for the lock, and extending lengthwise in said spindle is a key-slot $J^4$ in which a key $J^5$ is adapted to be inserted, said slot extending through the cap of the spindle. Secured to the inner end of said spindle is a gear-segment K which engages teeth L formed on the upper end of the lock-bolt. In Fig. 3 the said lock-bolt is shown in locked position with the lower end entered in the socket H in the axle and it is held in this position by a coil-spring M located in the upper end of the chamber I and bearing with its inner end against the lock-bolt. For the purpose of retaining said spring in proper position, the outer end of the lock-bolt is reduced, as at N, to form a shoulder $n$ against which said spring bears, said reduced-end-portion entering the inner end of the spring while the outer end of the latter is seated in a pocket O formed on the underside of the top wall $d^2$ of the casing.

When the lock-bolt G is withdrawn from the socket H formed in the axle, the key-slot $J^4$ registers with the series of lock-pins $j^4$ and said pins are projected by the springs $j^5$ into enlargements $j^6$ of the key-slot, thus holding the gear segment in the dotted position shown in Fig. 3, and necessarily holding the lock-bolt out of engagement with the axle. When the various parts are in this position, the wheel is free to rotate. When it is desired to lock the wheel against rotation, the key is inserted into the lock and acts against the lock-pins $j^4$, forcing them outward to disengage the same from the lock spindle $J^2$. The spindle is then free to turn, and at this time the spring M exerts its force against the upper end of the lock-bolt, forcing the same inward, and as soon as the socket H of the axle is brought into registration with the lock-bolt, the latter enters the socket and prevents rotation of the wheel. During this action, the gear-segment K has moved from the position shown in dotted lines, Fig. 3, to that shown in full lines and the enlargements $j^6$ of the key-slot are brought into registration with the lock-pins $j^3$. The operator now may withdraw the key if he has not already done so; and upon withdrawal of the key, the lock-pins $j^3$ enter the enlargements $j^6$ of the key-slot, thus preventing oscillation of the gear-segment K and consequently holding the lock-bolt in locked position.

When it is desired to withdraw the lock-bolt from the socket H in the axle of the wheel, the key is inserted into the key-slot $J^4$ and disengages the lock-pins $j^3$ from the enlargements of said key-slot. The spindle $J^2$ is then turned by means of the key to move the gear-segment from the position shown in full lines in Fig. 3 to that shown in dotted lines and causes the lock-bolt G to be moved outward against the action of the spring M. The withdrawal of the key permits the lock-pins $j^4$ to enter the enlargements $j^6$ of the key-slot and thus lock the parts against movement.

By guiding the lock-bolt in the bushing E, free movement is provided for said bolt where it passes between the secured ends of the spokes and through the hub and it is furthermore greatly strengthened at such points to withstand any strain brought against it by attempting to start the vehicle when said bolt is in locked position.

In order to render the locking-mechanism accessible, the inner wall $d$ of the casing is provided with an opening which is closed by a cover or plate Q fastened in position by screws or other suitable means.

Screw bolts R are threaded through the spokes and into threaded sockets S in the casing to secure the latter in position and between the inner ends of said bolts and the end walls of said pockets, coil-springs T are interposed which aid in forcing out the screw-bolts after they are unthreaded from the sockets.

As the construction of the several parts have been described in connection with their functions and mode of operation, separate explanation of the operation of the device will be unnecessary.

Having thus described my invention, what I claim is,—

1. The combination with an axle and a wheel rotatable on said axle and comprising a rim, a hub and radial spokes connecting said rim and hub, of a locking-device positioned between two adjoining spokes and comprising a casing having centrally therein an integral sleeve and at its inner end a bushing extending through said hub, and a spring-actuated lock-bolt extending through said sleeve and bushing and adapted to engage said axle to prevent rotation of said wheel.

2. The combination with an axle having a socket and a wheel rotatable on said axle and comprising a rim, a hub and radial spokes connecting said rim and hub, of a locking-device located between two adjoining spokes and comprising a tapering casing having a bushing at its inner end passing through said hub, a lock bolt provided with a series of gear-teeth and extending through said bushing to enter the socket in said axle, a gear-segment in mesh with said gear-teeth, and key-actuated mechanism to which said gear-segment is attached and by means of which it is actuated, substantially as set forth.

3. The combination with an axle and a wheel rotatable on said axle, of a locking-device comprising a casing held on said wheel, a lock-bolt within said casing having a series of teeth and being adapted to have its inner end engage said axle to prevent rotation of said wheel, a gear-segment in mesh with the teeth of said lock-bolt, and means for actuating said gear-segment.

4. The combination with an axle and a wheel rotatable on said axle, of a locking-device comprising a casing held on said wheel, a lock-bolt within said casing having a series of teeth and being adapted to have its inner end engage said axle to prevent rotation of said wheel, a gear-segment in mesh with the teeth of said lock-bolt, and locking-mechanism whereby said gear-segment may be actuated and locked in actuated position.

5. The combination with an axle and a wheel rotatable on said axle, of a locking-device comprising a casing held on said wheel, a lock-bolt within said casing having a series of teeth and being adapted to have its inner end engage said axle to prevent rotation of said wheel, a gear-segment in mesh with the teeth of said lock-bolt and normally held to retain said lock-bolt in a position permitting rotation of said wheel, and a spring acting to force the lower end of said lock-bolt in engagement with said axle when said gear-segment is released.

6. The combination with an axle having a socket and a wheel rotatable on said axle, of a locking-device comprising a casing held on said wheel and having a sleeve central and lengthwise therein and a bushing extending from its bottom and entering the hub of the wheel, a lock-bolt slidable in said sleeve and bushing and having a series of teeth at its upper end and its lower end arranged to enter the socket in said axle, a gear-segment in mesh with the teeth of said lock-bolt, locking-mechanism normally holding said gear-segment at one end of its range of movement and adapted to be actuated to release said segment to permit movement of the same and the lock-bolt engaged thereby, and a spring to actuate said lock-bolt when released.

7. The combination with an axle having a socket and a wheel rotatable on said axle, of a locking-device comprising a casing held on said wheel and having a sleeve central and lengthwise therein and a chamber into which the upper end of said sleeve opens, a lock-bolt slidable in said sleeve and having its lower end positioned to enter the socket in said axle, locking-mechanism in said chamber, and mechanism connecting said locking-mechanism with said lock-bolt.

8. The combination with an axle and a wheel rotatable on said axle and provided with spokes, of a locking-device including a casing set between two adjoining spokes and having threaded sockets in its side walls, coil-springs in the sockets of said casing, and screw-bolts passing through said adjoining spokes and threaded into said sockets to secure the casing in position and compress said springs.

In testimony whereof, I have affixed my signature in the presence of two subscribing witnesses.

ANDREW J. BORST, Jr.

Witnesses:
ELLA C. PLUECKHAHN,
EMIL NEUHART.